US012712611B2

(12) United States Patent
Gopal et al.

(10) Patent No.: US 12,712,611 B2
(45) Date of Patent: Aug. 18, 2026

(54) TECHNIQUES FOR ANTENNA-SWITCHED DIVERSITY AND MULTI-SIM CONCURRENT OPERATION MANAGEMENT

(71) Applicant: QUALCOMM Incorporated, San Diego, CA (US)

(72) Inventors: Thawatt Gopal, San Diego, CA (US); Sridhar Bandaru, Westminster, CO (US); Mihir Nabar, Hyderabad (IN); Qingxin Chen, San Diego, CA (US); Reza Shahidi, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 737 days.

(21) Appl. No.: 18/001,849

(22) PCT Filed: Sep. 1, 2021

(86) PCT No.: PCT/US2021/071336
§ 371 (c)(1),
(2) Date: Dec. 14, 2022

(87) PCT Pub. No.: WO2022/051754
PCT Pub. Date: Mar. 10, 2022

(65) Prior Publication Data

US 2023/0231603 A1 Jul. 20, 2023

(30) Foreign Application Priority Data

Sep. 2, 2020 (IN) ............................ 202041037832

(51) Int. Cl.
*H04B 7/06* (2006.01)
*H04B 7/0404* (2017.01)
(Continued)

(52) U.S. Cl.
CPC ......... *H04B 7/0602* (2013.01); *H04B 7/0404* (2013.01); *H04L 5/14* (2013.01); *H04W 88/06* (2013.01)

(58) Field of Classification Search
CPC .... H04B 7/0602; H04B 7/0404; H04B 17/14; H04L 5/14; H04W 88/06; H04W 76/15; H04W 76/28; H04W 60/005; H04W 8/18
See application file for complete search history.

(56) References Cited

U.S. PATENT DOCUMENTS 9,961,600 B2 5/2018 Gopal et al.
2016/0119039 A1* 4/2016 Soliman ................ H04W 72/51 455/553.1

(Continued)

FOREIGN PATENT DOCUMENTS

CN 108242991 A 7/2018
EP 3344000 A1 7/2018

(Continued)

OTHER PUBLICATIONS

International Search Report and Written Opinion—PCT/US2021/071336—ISA/EPO—Dec. 9, 2021.

*Primary Examiner* — Nizam U Ahmed
(74) *Attorney, Agent, or Firm* — Norton Rose Fulbright US LLP

(57) ABSTRACT

Wireless communication techniques for antenna-switched diversity and multi-SIM concurrent operation management are discussed. A UE may communicate via a transmission path associated with a first subscriber identification module (SIM). The transmission path may be mapped to one of a first one or more antennas in accordance with a determination as to whether the UE supports at least one of frequency-division duplex (FDD) antenna-switched diversity or time-division duplex (TDD) antenna-switched diversity when concurrently performing wireless communication associated (Continued)

with the first SIM and wireless communication associated with a second SIM. The UE may also communicate via at least one reception path associated with the second SIM. The at least one reception path may be mapped to a second one or more antennas in accordance with the determination as to whether the UE supports at least one of FDD antenna-switched diversity or TDD antenna-switched diversity.

27 Claims, 10 Drawing Sheets

(51) Int. Cl.
*H04L 5/14* (2006.01)
*H04W 88/06* (2009.01)

(56) References Cited

U.S. PATENT DOCUMENTS

2016/0219648 A1 7/2016 Awoniyi-Oteri et al.
2016/0295550 A1 10/2016 Sharma et al.
2017/0127436 A1* 5/2017 Li ....................... H04W 52/223
2018/0368098 A1 12/2018 Gopal et al.

FOREIGN PATENT DOCUMENTS

WO WO-2018005947 A1 1/2018
WO 2018141081 8/2018

* cited by examiner

Figure 3:
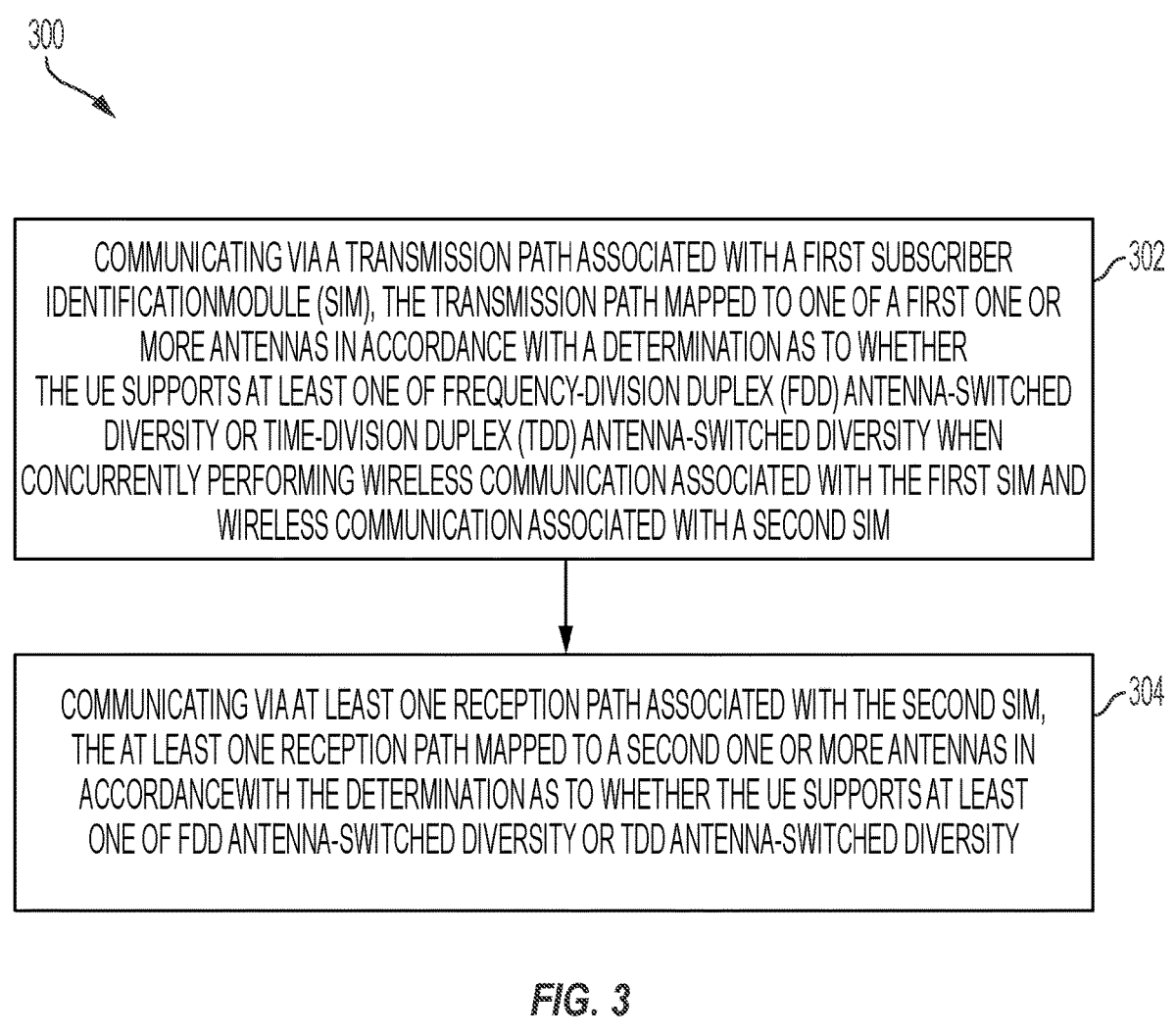

300

COMMUNICATING VIA A TRANSMISSION PATH ASSOCIATED WITH A FIRST SUBSCRIBER IDENTIFICATIONMODULE (SIM), THE TRANSMISSION PATH MAPPED TO ONE OF A FIRST ONE OR MORE ANTENNAS IN ACCORDANCE WITH A DETERMINATION AS TO WHETHER THE UE SUPPORTS AT LEAST ONE OF FREQUENCY-DIVISION DUPLEX (FDD) ANTENNA-SWITCHED DIVERSITY OR TIME-DIVISION DUPLEX (TDD) ANTENNA-SWITCHED DIVERSITY WHEN CONCURRENTLY PERFORMING WIRELESS COMMUNICATION ASSOCIATED WITH THE FIRST SIM AND WIRELESS COMMUNICATION ASSOCIATED WITH A SECOND SIM

302

COMMUNICATING VIA AT LEAST ONE RECEPTION PATH ASSOCIATED WITH THE SECOND SIM, THE AT LEAST ONE RECEPTION PATH MAPPED TO A SECOND ONE OR MORE ANTENNAS IN ACCORDANCEWITH THE DETERMINATION AS TO WHETHER THE UE SUPPORTS AT LEAST ONE OF FDD ANTENNA-SWITCHED DIVERSITY OR TDD ANTENNA-SWITCHED DIVERSITY

404
402
408
410
412
414
416
Tx
PRx
406
411
1
2
3
4
5
418
422
Ant-1
442
424
Ant-2
432
DRx
426
Ant-3
434
MIM01
452
SIM2: B3 PRX
444
428
Ant-4
436
MIM02
454
SIM2: B3 DRX
446

TECHNIQUES FOR ANTENNA-SWITCHED DIVERSITY AND MULTI-SIM CONCURRENT OPERATION MANAGEMENT

CROSS-REFERENCE TO RELATED APPLICATIONS

This application claims the benefit of Indian Patent Application number 202041037832, entitled, "TECHNIQUES FOR ANTENNA-SWITCHED DIVERSITY AND MULTI-SIM CONCURRENT OPERATION MANAGEMENT," filed on Sep. 2, 2020, which is expressly incorporated by reference herein in its entirety.

TECHNICAL FIELD

Aspects of the present disclosure relate generally to wireless communication systems, and more particularly, to techniques for antenna-switched diversity and multi-SIM concurrent operation management. Certain aspects of the technology discussed below can enable and provide enhanced communication features and techniques for communication systems, including higher data rates, higher reliability, enhanced coexistence, higher mobility, and lower power device operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication performed by a UE is provided. For example, a method can include communicating via a transmission path associated with a first subscriber identification module (SIM). The transmission path may be mapped to one of a first one or more antennas in accordance with a determination as to whether the UE supports at least one of frequency-division duplex (FDD) antenna-switched diversity or time-division duplex (TDD) antenna-switched diversity when concurrently performing wireless communication associated with the first SIM and wireless communication associated with a second SIM. The method may also include communicating via at least one reception path associated with the second SIM. The at least one reception path mapped to a second one or more antennas in accordance with the determination as to whether the UE supports at least one of FDD antenna-switched diversity or TDD antenna-switched diversity.

In another aspect of the disclosure, a UE configured for wireless communication is provided. For example, the UE can include means for communicating via a transmission path associated with a first SIM. The transmission path may be mapped to one of a first one or more antennas in accordance with a determination as to whether the UE supports at least one of FDD antenna-switched diversity or TDD antenna-switched diversity when concurrently performing wireless communication associated with the first SIM and wireless communication associated with a second SIM. The UE may also include means for communicating via at least one reception path associated with the second SIM. The at least one reception path may be mapped to a second one or more antennas in accordance with the determination as to whether the UE supports at least one of FDD antenna-switched diversity or TDD antenna-switched diversity.

In an additional aspect of the disclosure, a non-transitory computer-readable medium having program code recorded thereon is provided. The program code can include program code executable by a computer for causing the computer to communicate via a transmission path associated with a first subscriber identification module (SIM). The transmission path may be mapped to one of a first one or more antennas in accordance with a determination as to whether the UE supports at least one of FDD antenna-switched diversity or TDD antenna-switched diversity when concurrently performing wireless communication associated with the first SIM and wireless communication associated with a second SIM. The program code can include program code executable by a computer for causing the computer to communicate via at least one reception path associated with the second SIM. The at least one reception path may be mapped to a second one or more antennas in accordance with the determination as to whether the UE supports at least one of FDD antenna-switched diversity or TDD antenna-switched diversity.

In another aspect of the disclosure, a UE is provided. The UE may include at least one processor. The UE may also include at least one memory communicatively coupled with the at least one processor and storing processor-readable code that, when executed by the at least one processor, is configured to communicate via a transmission path associated with a first subscriber identification module (SIM). The transmission path may be mapped to one of a first one or more antennas in accordance with a determination as to whether the UE supports at least one of frequency-division duplex (FDD) antenna-switched diversity or time-division duplex (TDD) antenna-switched diversity when concurrently performing wireless communication associated with the first SIM and wireless communication associated with a second SIM. The processor-readable code that, when executed by the at least one processor, may further be configured to communicate via at least one reception path associated with the second SIM. The at least one reception path may be mapped to a second one or more antennas in accordance with the determination as to whether the UE supports at least one of FDD antenna-switched diversity or TDD antenna-switched diversity.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

FIG. 3 is a block diagram illustrating a method for antenna-switched diversity and multi-SIM concurrent operation management according to some aspects of the present disclosure.

DETAILED DESCRIPTION

Figure 1:
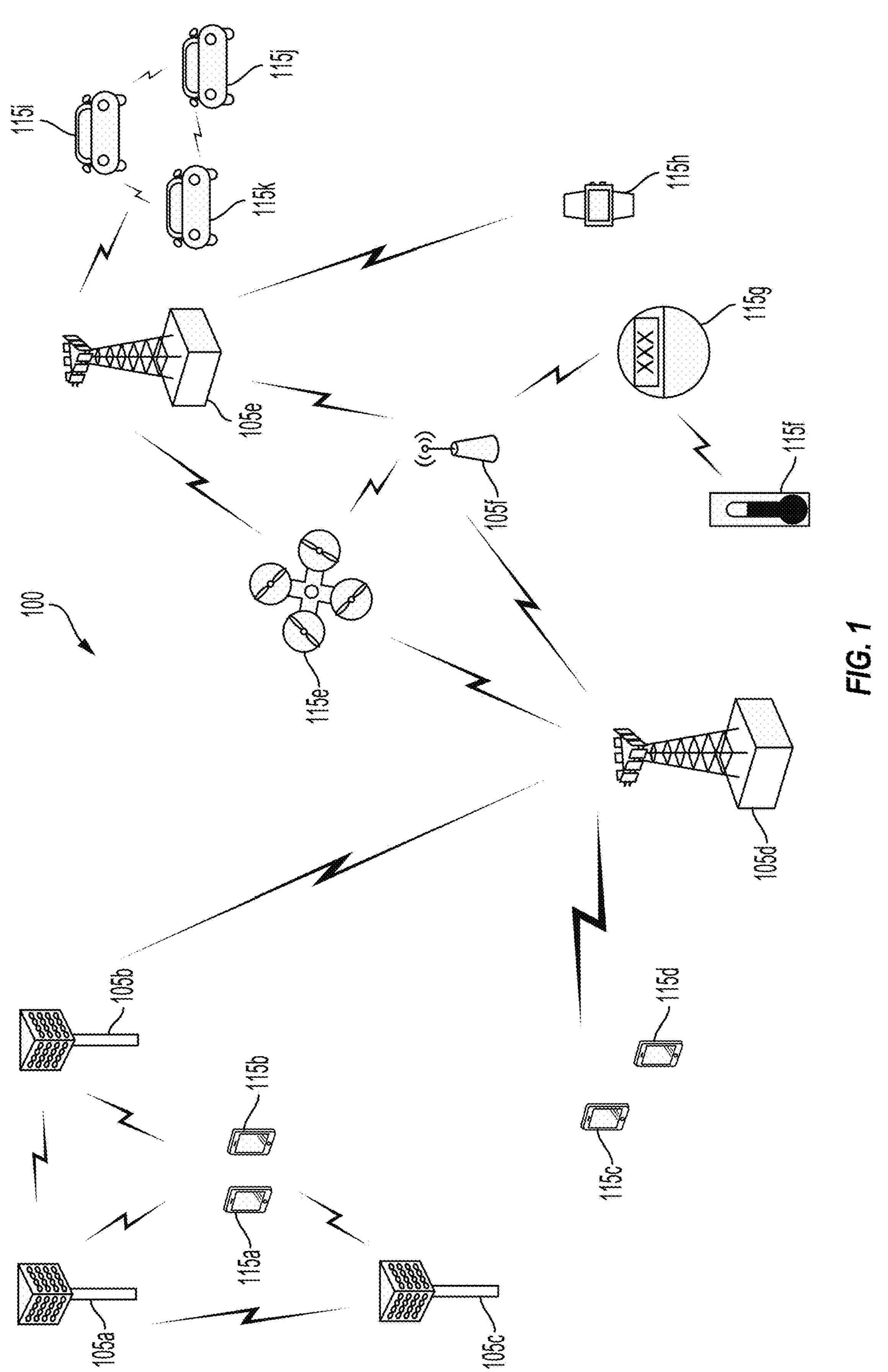
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multipoint (COMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
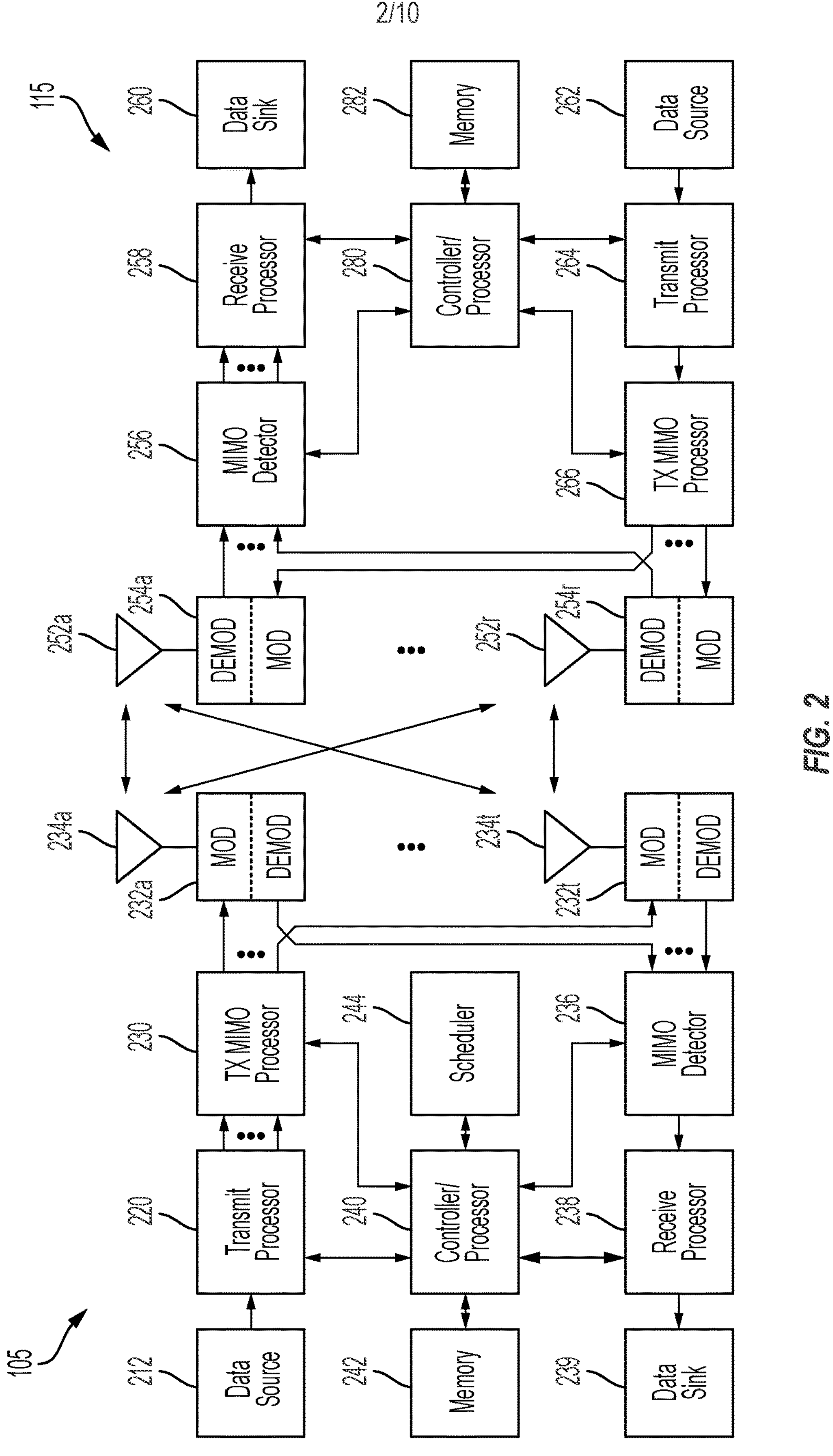
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115D operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, the antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIG. 3, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In some aspects of the disclosure, a UE, such as a UE 115, may include multiple subscriber identification modules (SIMs). For example, in some aspects, a UE may include two SIMs and may perform multi-SIM concurrent operation. As an example, a UE may perform multi-SIM concurrent operation when the UE has two SIMs by concurrently performing wireless communication associated with a first SIM and wireless communication associated with a second SIM.

According to some aspects, a UE may use the same RF front-end circuitry and antennas to perform wireless communication associated with different SIMs. For example, wireless communication associated with a first SIM may be performed using at least some of the same antennas and RF front-end circuitry, such as filters, amplifiers, and switches, used to perform wireless communication associated with a second SIM.

Aspects of this disclosure may provide enhanced multi-SIM concurrent operation management schemes. The schemes may allow a UE to use some or all of its available antennas for antenna-switched diversity schemes utilized for wireless communication that is associated with a first SIM while also allowing the UE to concurrently use some or all of its available antennas to receive information as part of wireless communication associated with a second SIM. In some aspects, the first SIM may be associated with a connection with a base station and the second SIM may not be associated with a connection with a base station. For example, the second SIM may be operating in an idle mode. Aspects of this disclosure may ensure that wireless communication associated with a first SIM and wireless communication associated with a second SIM do not interrupt each other during concurrent operation. Aspects of this disclosure may account for various antenna switch hardware types used by a UE to perform multi-SIM concurrent operation. Aspects of this disclosure may also account for the need to allocate RF front-end circuitry and antennas to a second SIM operating in an idle mode when it wakes up to perform its idle-mode wireless communication operations, such as reading and/or decoding a paging message, while a first SIM is operating in a connected mode to transmit and/or receive information.

FIG. 3, as an example, shows a block diagram illustrating a method for antenna-switched diversity and multi-SIM concurrent operation management according to some aspects of the present disclosure. Aspects of method 300 may be implemented with various other aspects of this disclosure described with respect to FIGS. 1-2 and 9, such as a mobile device/UE. For example, with reference to FIG. 2, controller/processor 280 of UE 115 may control UE 115 to perform method 300.

FIG. 3 illustrates a method 300 that may be performed by a wireless communication device, such as a UE 115. At block 302, a UE, such as UE 115, may communicate (e.g., transmit) via a transmission path associated with a first SIM; the transmission path may be mapped to one of a first one or more antennas in accordance with a determination as to whether the UE supports at least one of FDD antenna-switched diversity or TDD antenna-switched diversity when concurrently performing wireless communication associated with the first SIM and wireless communication associated with a second SIM. Method 300 also include, at block 304, the UE communicating (e.g., receiving) via at least one reception path associated with the second SIM; the at least one reception path may be mapped to a second one or more antennas in accordance with the determination as to whether the UE supports at least one of FDD antenna-switched diversity or TDD antenna-switched diversity.

In some aspects, the transmission path, such as at block 302, and the at least one reception path, such as at block 304, may be mapped to their respective antennas to prevent an antenna switch conflict from occurring when concurrently performing wireless communication associated with the first SIM and wireless communication associated with the second SIM. According to some aspects, an antenna switch conflict may refer to reconfiguration of the mapping of the transmission path or reconfiguration of the mapping of the at least one reception path. In other words, antenna switch conflict may refer to reconfiguration of the transmission path or reconfiguration of the at least one reception path. Therefore, in some aspects, the transmission path associated with the first SIM may be mapped to one of a first one or more antennas such that it does not reconfigure the mapping of the at least one reception path associated with the second SIM to a second one or more antennas, and the at least one reception path associated with the second SIM may be mapped to a second one or more antennas such that it does not reconfigure the mapping of the transmission path associated with the first SIM to one of a first one or more antennas.

According to some aspects, the actions shown at blocks 302 through 304 of method 300 may be a subset of the overall operations performed by a UE to perform antenna-switched diversity and multi-SIM concurrent operation management. The relationship between the actions shown at blocks 302 through 304 of method 300 and other operations that are performed by a UE to perform antenna-switched diversity and multi-SIM concurrent operation management may become more evident from a discussion of the overall operations performed by a UE or base station to perform antenna-switched diversity and multi-SIM concurrent operation management.

Figures 4A, 4B:
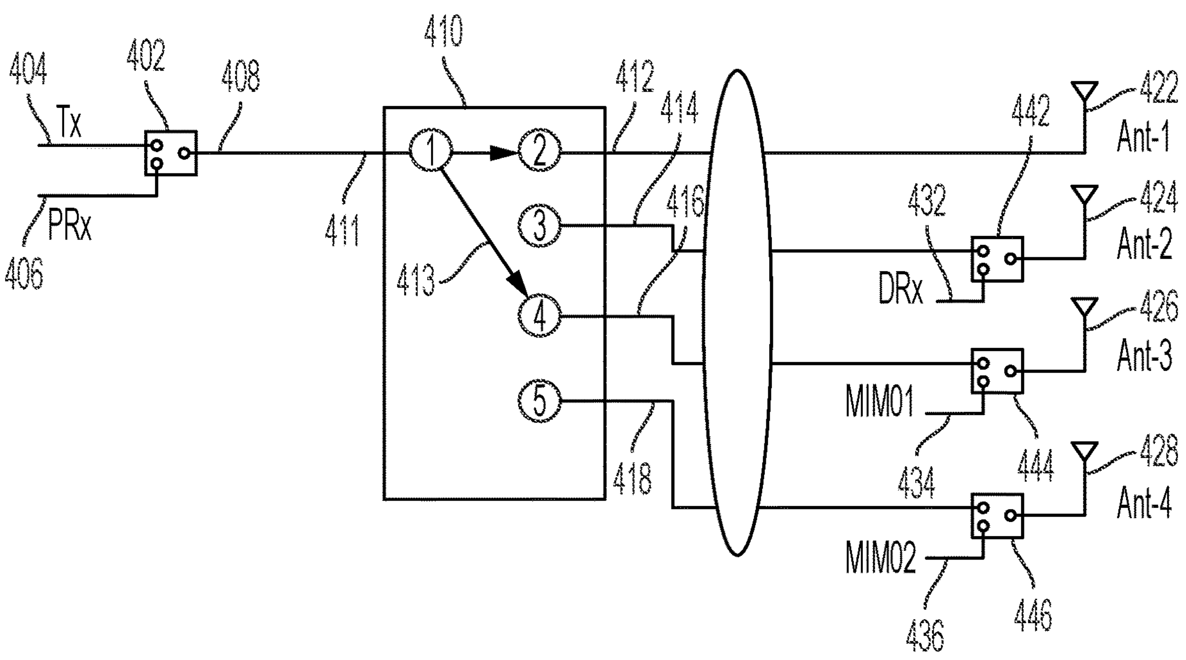
FIG. 4A is a block diagram illustrating an example of time-division duplex (TDD) antenna-switched diversity according to some aspects of the present disclosure.
FIG. 4B is a block diagram illustrating an example of TDD antenna-switched diversity and multi-SIM concurrent operation management according to some aspects of the present disclosure.

FIG. 4A shows a block diagram illustrating an example of TDD antenna-switched diversity according to some aspects of the present disclosure. FIG. 4A shows a switch 402. Switch 402 may have as one input a transmission path 404 and as another input a reception path 406. The transmission path 404 and the reception path 406 may both be associated with wireless communication that is associated with a first SIM. In some aspects, wireless communication associated with the first SIM may refer to wireless communication performed using a connection with a base station that is established based on information associated with the first SIM. For example, a UE may have a connection with a base station that is established based on information associated with the first SIM.

The UE may perform wireless communication associated with the first SIM by using the first-SIM-based connection with the base station to transmit/receive information to/from the base station. For example, the UE may use transmission path 404 to transmit information to the base station and may use reception path 406 to receive information from the base station. Depending on whether information is being transmitted or received, switch 402 may electrically couple transmission path 404 or reception path 406 to its output 408.

In some aspects, another switch 410 may be used to electrically couple the output 408 of switch 402 to one of the outputs 412, 414, 416, and 418 of switch 410. As illustrated in FIG. 4A, output 408 of switch 402 may be electrically coupled to input 411 of switch 410. In addition, each of the outputs 412, 414, 416, and 418 of switch 410 may be electrically coupled to a distinct antenna 422, 424, 426, and 428, respectively.

According to some aspects, when transmission path 404 is selected by switch 402, a UE may utilize an antenna-switched diversity scheme to determine which one of the outputs of switch 410, and therefore which one of the associated antennas, should be electrically coupled to output 408 of switch 402 to transmit the information on transmission path 404. In some aspects, an antenna-switched diversity scheme may include various operations. For example, an antenna-switched diversity scheme may include a UE performing measurements on one or more of its antennas, then selecting the antenna yielding the best communication properties as the antenna to be used to transmit information. Referring to FIG. 4A, a UE may utilize an antenna-switched diversity scheme to determine which of antennas 422, 424, 426, and 428 should be used as a transmit antenna. As illustrated by arrow 413, in the aspect illustrated in FIG. 4A, the UE may utilize an antenna-switched diversity scheme to determine that antenna 426 should be used as the transmit antenna for transmission of information associated with the first SIM. As such, switch 410 may be configured to couple output 416 of switch 410, which is coupled to antenna 426, to input 411 so that information from transmission path 404 associated with the first SIM may be transmitted using antenna 426.

In some aspects, the UE may be free to subsequently change the antenna-to-transmission path configuration. For example, in some aspects, the UE may subsequently electrically couple transmission path 404 to a different antenna, such as antenna 424, when the UE determines that a different antennas, such as antenna 424, is better-suited than antenna 426 to be the transmit antenna for transmission of information on transmit path 404. Therefore, in some aspects, as the communication environment changes, the UE can change the transmit antenna to ensure that the best, or one of the best, antennas is being used to transmit information.

According to some aspects, when reception path 406 is selected by switch 402, a UE may not utilize an antenna-switched diversity scheme to select a best antenna to couple to reception path 406 to receive information from a base station. For example, in some aspects, a switch used to perform TDD antenna-switched diversity may be configured to couple a reception path at its input to a particular output port (and associated antenna) and may be configured to not subsequently change that original coupling configuration. For example, with reference to FIG. 4A, switch 410 may be configured to couple input 411 to output 412, and therefore also to antenna 422, when switch 402 couples reception path 406 to input 411 of switch 410. According to some aspects, that coupling configuration, i.e., reception path 406 to antenna 422, may not be subsequently changed by switch 410. As a result, in some aspects, anytime the UE receives information associated with the first SIM, reception path 406 may include information received at the same antenna, such as antenna 422. In some aspects, additional reception paths used by the UE to concurrently receive information associated with the first SIM along with reception path 406 may also each be coupled to only one respective antenna. For example, in FIG. 4A, a second reception path 432, a third reception path 434, and a fourth reception path 436 may be capable of being coupled to only antenna 424, antenna 426, and antenna 428, respectively. As illustrated in FIG. 4A, switches 442, 444, and 446 may be used to respectively couple antennas 424, 426, and 428 to either outputs 414, 416, and 418, respectively, or second reception path 432, third reception path 434, and fourth reception path 436, respectively.

In some aspects, such as at block 302 of FIG. 3, a UE may communicate (e.g., transmit) via a transmission path that is mapped to one of the UEs antennas in accordance with a determination that the UE may utilize TDD antenna-switched diversity when the UE concurrently performs wireless communication associated with a first SIM and wireless communication associated with a second SIM. For example, a UE utilizing switch 410 to couple a transmission path to one of the UE's antennas may determine that it supports TDD antenna-switched diversity when concurrently performing wireless communication associated with a first SIM and wireless communication associated with a second SIM. As shown at block 304 of FIG. 3, according to some aspects, in accordance with the determination that the UE supports TDD antenna-switched diversity when the UE concurrently performs wireless communication associated with a first SIM and wireless communication associated with a second SIM, the UE may communicate (e.g., receive) via at least one reception path associated with the second SIM; the at least one reception path may be mapped to a second one or more antennas in accordance with the determination as to whether the UE utilizes TDD antenna-switched diversity.

FIG. 4B, as an example, shows a block diagram illustrating an example of TDD antenna-switched diversity and multi-SIM concurrent operation management according to some aspects of the present disclosure. In some aspects, FIG. 4B may show how a transmission path associated with the first SIM may be mapped to one of a first one or more antennas, and at least one reception path associated with the second SIM may be mapped to a second one or more antennas, so as to prevent an antenna switch conflict from occurring when the UE concurrently performs wireless communication associated with the first SIM and wireless communication associated with the second SIM.

As shown in FIG. 4B, mapping a transmission path associated with the first SIM to one of a first one or more antennas in accordance with the determination that the UE supports TDD antenna-switched diversity, such as the mapped transmission path described at block 302 of FIG. 3, may include the UE configuring switches 402 and 410 to electrically couple transmission path 404 to one of either antenna 422 or antenna 424. In other words, in FIG. 4B, the first one or more antennas shown at block 304 of FIG. 3 may refer to antennas 422 and 424. In general, however, the first one or more antennas may refer to a subset of the antennas available to the UE for transmission of information, and may not be limited in every aspect to only two antennas. In some aspects, the UE may utilize an antenna-switched diversity scheme to determine which of antennas 422 or 424 should be electrically coupled to transmission path 404. Therefore, in some aspects, mapping the transmission path associated with the first SIM to one of the first one or more antennas, such as the mapped transmission path described at block 304 of FIG. 3, may include the UE allocating the first one or more antennas for antenna-switched diversity. In the aspect of FIG. 4B, the UE has selected, based on antenna-switched diversity, to electrically couple antenna 424 to transmission path 404. According to some aspects, by limiting the antennas that may be used for antenna-switched diversity, e.g., to antennas 422 and 424 in FIG. 4B, the UE may leave some antennas available to be used when wireless communication associated with the second SIM is performed concurrently with the wireless communication associated with the first SIM. According to some aspects, this may prevent an antenna switch conflict from occurring during concurrent operation of wireless communication associated with the second SIM and wireless communication associated with the first SIM.

In some aspects, wireless communication associated with a second SIM may be performed concurrently with wireless communication associated with the first SIM. According to some aspects, wireless communication associated with a second SIM may refer to reception of information associated with the second SIM. According to some aspects, there may not be a connection established with a base station based on information associated with the second SIM. In some aspects, the second SIM may be in an idle state, and the reception of information may occur during time periods that the UE is scheduled to have the second SIM exit the idle state and monitor a channel for possible information to be received.

In FIG. 4B, reception path 452 and reception path 454 may be associated with the second SIM. For example, the UE may use at least one of reception paths 452 or 454 to receive information associated with the second SIM. In some aspects, at least one of reception paths 452 or 454 may be used to receive information associated with the second SIM during time periods that the UE is scheduled to monitor a channel for possible information to be received. In some aspects, reception path 452 may be duplexed with third reception path 434 associated with the first SIM and reception path 454 may be duplexed with fourth reception path 436 associated with the first SIM.

According to some aspects, during multi-SIM concurrent operation, the UE may need to have at least one antenna available for wireless communication associated with the second SIM, e.g., to receive information associated with the second SIM using at least one of reception paths 452 or 454 during time periods that the UE is scheduled to monitor a channel associated with the second SIM. As shown in FIG. 4B, a UE may communicate (e.g., receive) via at least one reception path associated with the second SIM. The at least one reception path may be mapped to a second one or more antennas in accordance with the determination that the UE supports TDD antenna-switched diversity, such as the mapping described at block 304 of FIG. 3, may include the UE configuring at least one of reception path 452 or reception path 454 to be electrically coupled to at least one of antenna 426 or antenna 428. For example, in some aspects, the UE may configure at least one of switch 444 or switch 446 to electrically couple at least one of reception path 452 or reception path 454 to at least one of antenna 426 or antenna 428. As shown in FIG. 4B, the UE may configure reception path 452 to be capable of being electrically coupled to antenna 426 and may configure reception path 454 to be capable of being electrically coupled to antenna 428. In FIG. 4B, the UE may allocate at least one of antenna 426 or antenna 428 for reception of information associated with the second SIM. In other words, in FIG. 4B, the second one or more antennas shown at block 304 of FIG. 3 may refer to antennas 426 and 428. In general, however, the second one or more antennas may refer to a subset of the antennas available to the UE for transmission of information, and may not be limited in every aspect to only two antennas. In some aspects, the UE may use only one of antennas 426 or 428, and therefore only one of reception paths 452 or 454, to receive information associated with the second SIM during time periods that the UE is scheduled to monitor a channel associated with the second SIM. In additional aspects, the UE may use both of antennas 426 and 428, and therefore both of reception paths 452 and 454, to receive information associated with the second SIM during time periods that the UE is scheduled to monitor a channel associated with the second SIM.

As shown in FIG. 4B, in some aspects, the transmission path 404 mapped to one of either antenna 422 or antenna 424 may be based on antenna-switched diversity, and the at least one of reception path 452 or 454 mapped to at least one of antenna 426 or antenna 428, such as at block 304, may prevent an antenna switch conflict from occurring when the UE concurrently performs wireless communication associated with the first SIM and wireless communication associated with the second SIM. For example, in FIG. 4B, transmission path 404 is mapped to a first one or more antennas (antennas 422 and 424) such that that mapping does not affect, e.g., reconfigure, the mapping of the at least one reception path (reception paths 452 or 454) to the second one or more antennas (antennas 426 and 428). Similarly, the at least one reception path (reception paths 452 or 454) may be mapped to the second one or more antennas (antennas 426 and 428) such that that mapping does not affect, e.g., reconfigure, the mapping of the transmission path 404 to one of a first one or more antennas (antennas 422 and 424).

Figure 5A:
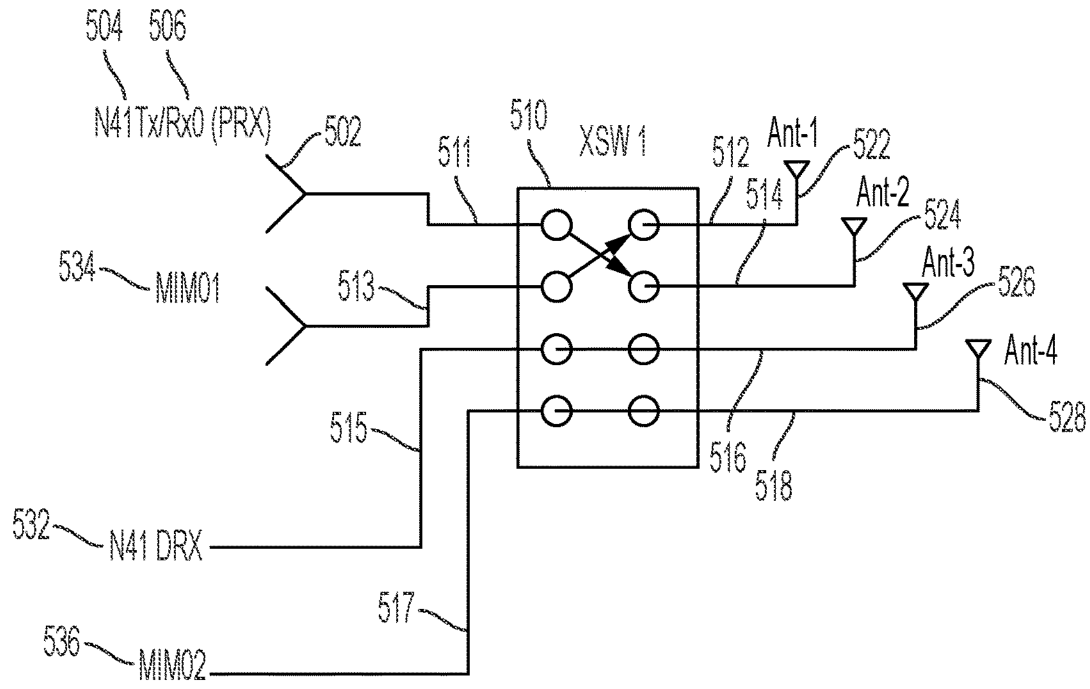
FIG. 5A is a block diagram illustrating an example of frequency-division duplex (FDD) antenna-switched diversity according to some aspects of the present disclosure.

FIG. 5A shows a block diagram illustrating an example of FDD antenna-switched diversity according to some aspects of the present disclosure. FIG. 5A shows a switch 502. Switch 502 may have as one input a transmission path 504 and as another input a reception path 506. The transmission path 504 and the reception path 506 may both be associated with wireless communication that is associated with a first SIM. For example, the UE may use transmission path 504 to transmit information to a base station and may use reception path 506 to receive information from the base station. Depending on whether information is being transmitted or received, switch 502 may electrically couple transmission path 504 or reception path 506 to input 511 of switch 510.

In some aspects, switch 510 may be used to electrically couple the output of switch 502 to one of the outputs 512, 514, 516, and 518 of switch 510. As illustrated in FIG. 5A, each of the outputs 512, 514, 516, and 518 of switch 510 may be electrically coupled to a distinct antenna 522, 524, 526, and 528, respectively.

According to some aspects, when transmission path 504 is selected by switch 502, a UE may utilize an antenna-switched diversity scheme to determine which one of the outputs of switch 510, and therefore which one of the associated antennas, should be electrically coupled to input 511 to transmit the information on transmission path 504. In FIG. 5A, a UE may utilize an antenna-switched diversity scheme to determine which of antennas 522, 524, 526, and 528 should be used as a transmit antenna. As illustrated in FIG. 5A, the UE may utilize an antenna-switched diversity scheme to determine that antenna 524 should be used as the transmit antenna for transmission of information associated with the first SIM. As such, switch 510 may be configured to couple output 514 of switch 510, which is coupled to antenna 524, to input 511 so that information from transmission path 504 associated with the first SIM may be transmitted using antenna 524.

In some aspects, the UE may be free to subsequently change the antenna-to-transmission path configuration. For example, in some aspects, the UE may subsequently electrically couple transmission path 504 to a different antenna, such as antenna 526, when the UE determines that a different antennas, such as antenna 526, is better-suited than antenna 524 to be the transmit antenna for transmission of information on transmit path 504. Therefore, in some aspects, as the communication environment changes, the UE can change the transmit antenna to ensure that the best, or one of the best, antennas is being used to transmit information.

According to some aspects, when reception path 506 is selected by switch 502, a UE may not utilize an antenna-switched diversity scheme to select a best antenna to couple to reception path 506 to receive information from a base station. For example, in some aspects, a switch used to perform FDD antenna-switched diversity may be configured to couple a primary reception path 506 associated with a primary transmission path 504, e.g., via a switch that selects between the two paths, to the same output that was coupled to input 511 when switch 502 selected transmission path 504. For example, with reference to FIG. 5A, because the UE configured switch 510 to electrically couple transmission path 504 at its input 511 to output 514, and therefore also to antenna 524, the UE may also configured switch 510 to electrically couple reception path 506 at its input 511 to output 514, and therefore also to antenna 524, when switch 502 couples reception path 506 to input 511 of switch 410. According to some aspects, that coupling configuration, i.e., reception path 506 to antenna 524, may be subsequently changed by switch 510 only when the coupling configuration between transmission path 504 and an antenna is changed. As a result, in some aspects, even when switch 502 toggles between transmission path 504 and reception path 506, the coupling configuration between input 511 and an output of switch 510 may not change. In some aspects, additional reception paths used by the UE to concurrently receive information associated with the first SIM along with reception path 506 may be coupled to different antennas. For example, in FIG. 5A, a second reception path 532, a third reception path 534, and a fourth reception path 536 may be capable of being coupled to antenna 526, antenna 522, and antenna 528, respectively.

In some aspects, such as at block 302 of FIG. 3, a UE may communicate (e.g., transmit) via a transmission path that is mapped to one of the UEs antennas in accordance with a determination that the UE may utilize FDD antenna-switched diversity when the UE concurrently performs wireless communication associated with a first SIM and wireless communication associated with a second SIM. For example, a UE utilizing switch 510 to couple a transmission path to one of the UE's antennas may determine that it supports FDD antenna-switched diversity when concurrently performing wireless communication associated with a first SIM and wireless communication associated with a second SIM. As shown at block 304 of FIG. 3, according to some aspects, in accordance with the determination that the UE supports FDD antenna-switched diversity when the UE concurrently performs wireless communication associated with a first SIM and wireless communication associated with a second SIM, the UE may communicate (e.g., receive) via at least one reception path associated with the second SIM; the at least one reception path may be mapped to a second one or more antennas in accordance with the determination that the UE may utilize FDD antenna-switched diversity.

Figure 5B:
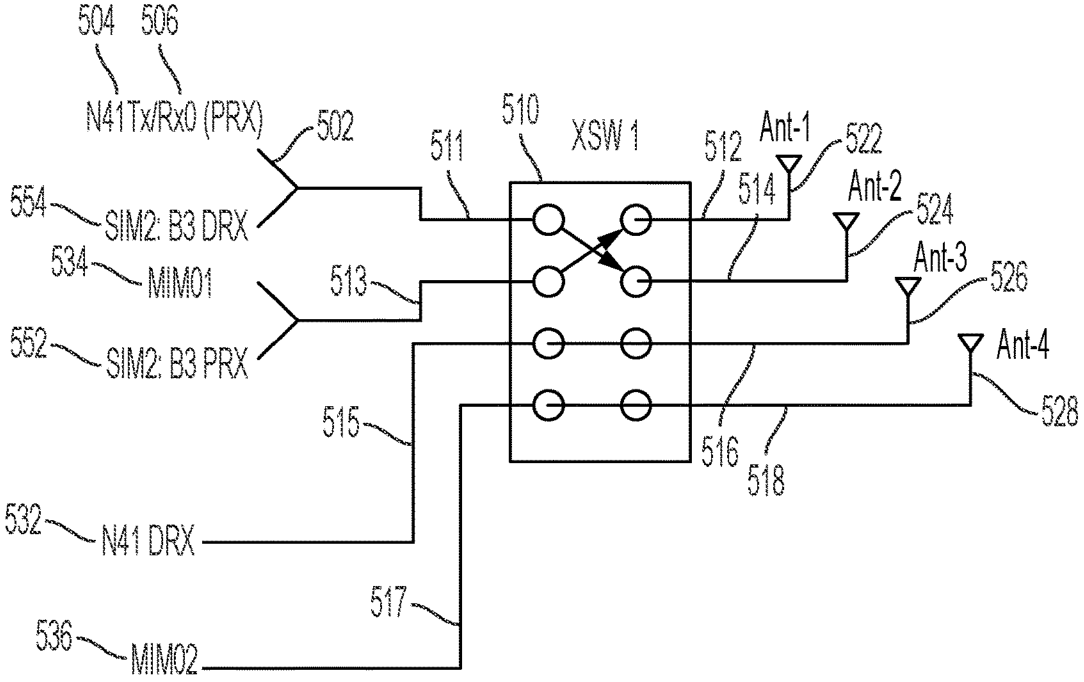
FIG. 5B is a block diagram illustrating an example of FDD antenna-switched diversity and multi-SIM concurrent operation management according to some aspects of the present disclosure.

FIG. 5B, as an example, shows a block diagram illustrating an example of FDD antenna-switched diversity and multi-SIM concurrent operation management according to some aspects of the present disclosure. In some aspects, FIG. 5B may show how a transmission path associated with the first SIM may be mapped to one of a first one or more antennas, and at least one reception path associated with the second SIM may be mapped to a second one or more antennas, so as to prevent an antenna switch conflict from occurring when the UE concurrently performs wireless communication associated with the first SIM and wireless communication associated with the second SIM.

As shown in FIG. 5B, mapping a transmission path associated with the first SIM to one of a first one or more antennas in accordance with the determination that the UE supports FDD antenna-switched diversity, such as the mapping described at block 304 of FIG. 3, may include the UE configuring switches 502 and 510 to electrically couple transmission path 504 to one of antennas 522, 524, 526, or 528. In other words, in FIG. 5B, the first one or more antennas shown at block 304 of FIG. 3 may refer to antennas 522, 524, 526, and 528. In general, however, the first one or more antennas may refer to a subset or all of the antennas available to the UE for transmission of information. In some aspects, the UE may utilize an antenna-switched diversity scheme to determine which of antennas 522, 524, 526, or 528 should be electrically coupled to transmission path 504. Therefore, in some aspects, mapping the transmission path associated with the first SIM to one of the first one or more antennas, such as the mapping described at block 304 of FIG. 3, may include the UE allocating the first one or more antennas for antenna-switched diversity. In the aspect of FIG. 5B, the UE has selected, based on antenna-switched diversity, to electrically couple antenna 524 to transmission path 504.

In FIG. 5B, reception path 552 and reception path 554 may be associated with the second SIM. For example, the UE may use at least one of reception paths 552 or 554 to receive information associated with the second SIM. In some aspects, at least one of reception paths 552 or 554 may be used to receive information associated with the second SIM during time periods that the UE is scheduled to monitor a channel for possible information to be received. In some aspects, reception path 552 may be duplexed with third reception path 534 associated with the first SIM and reception path 554 may be duplexed with reception path 506 associated with the first SIM.

According to some aspects, during multi-SIM concurrent operation, the UE may need to use at least one antenna for wireless communication associated with the second SIM, e.g., to receive information associated with the second SIM using at least one of reception paths 552 or 554 during time periods that the UE is scheduled to monitor a channel associated with the second SIM. As shown in FIG. 5B, mapping at least one reception path associated with the second SIM to a second one or more antennas in accordance with the determination that the UE supports FDD antenna-switched diversity, such as the at least one reception path mapped to second one or more antennas described at block 304 of FIG. 3, may include the UE configuring at least one of reception path 552 or reception path 554 to be electrically coupled to at least one of antenna 522 or antenna 524. For example, in some aspects, the UE may configure switch 510 to electrically couple at least one of reception path 552 or reception path 554 to at least one of antenna 522 or antenna 524. As shown in FIG. 5B, the UE may configure reception path 552 to be capable of being electrically coupled to antenna 522 and may configure reception path 554 to be capable of being electrically coupled to antenna 524. In FIG. 5B, the UE may allocate at least one of antenna 522 or antenna 524 for reception of information associated with the second SIM. In other words, in FIG. 5B, the second one or more antennas shown at block 304 of FIG. 3 may refer to antennas 522 and 524. In general, however, the second one or more antennas may refer to a subset of the antennas available to the UE for transmission of information, and may not be limited in every aspect to only two antennas. In some aspects, the UE may use only one of antennas 522 or 524, and therefore only one of reception paths 552 or 554, to receive information associated with the second SIM during time periods that the UE is scheduled to monitor a channel associated with the second SIM. In additional aspects, the UE may use both of antennas 522 and 524, and therefore both of reception paths 552 and 554, to receive information associated with the second SIM during time periods that the UE is scheduled to monitor a channel associated with the second SIM.

As shown in FIG. 5B, in some aspects, the mapping of the transmission path 504 to one of the antennas 522, 524, 526, and 528 based on antenna-switched diversity, and the mapping of at least one of reception path 552 or 554 to at least one of antenna 522 or antenna 524, such as at block 304, may prevent an antenna switch conflict from occurring when the UE concurrently performs wireless communication associated with the first SIM and wireless communication associated with the second SIM. For example, in FIG. 5B, the mapping of transmission path 504 to a first one or more antennas (antennas 522, 524, 526, or 528) may not affect, e.g., reconfigure, the mapping of the at least one reception path (reception paths 552 or 554) to the second one or more antennas (antennas 552 and 524). Similarly, the mapping of the at least one reception path (reception paths 552 or 554) to the second one or more antennas (antennas 522 and 524) may not affect, e.g., reconfigure, the mapping of the transmission path 504 to one of a first one or more antennas (antennas 522, 524, 526, or 528).

In some aspects, a UE may determine whether it supports FDD or TDD antenna-switched diversity when it concurrently performs wireless communication associated with a first SIM and wireless communication associated with a second SIM in a variety of ways. For example, in some aspects, the determination at block 302 may be in accordance with the UE's determination as to whether the primary reception path can be mapped to a different antenna than is mapped to the primary transmit path. If so, the UE may determine that the UE supports TDD antenna-switched diversity. If not, the UE may determine that the UE supports FDD antenna-switched diversity. In additional aspects, the determination at block 302 may be in accordance with the UE's determination as to whether the mapping of reception paths associated with the first SIM to antennas can be changed. If so, the UE may determine that the UE supports FDD antenna-switched diversity. If not, the UE may determine that the UE supports TDD antenna-switched diversity.

According to some aspects, the first one or more antennas, such as the first one or more antennas shown at block 304, may include more antennas when the UE supports FDD antenna-switched diversity than when the UE supports TDD antenna-switched diversity. For example, the first one or more antennas in FIG. 5B associated with FDD antenna-switched diversity includes four antennas (antennas 522, 524, 526, and 528), whereas the first one or more antennas in FIG. 4B associated with TDD antenna-switched diversity includes two antennas (antennas 422 and 424).

In some aspects, the second one or more antennas, such as the second one or more antennas shown at block 304, may include a subset of the first one or more antennas. For example, in FIG. 5B associated with FDD antenna-switched diversity, the second one or more antennas (antennas 522 and 524) may be a subset of the first one or more antennas (antennas 522, 524, 526, and 528).

According to some aspects, the second one or more antennas, such as the second one or more antennas shown at block 304, may not include the first one or more antennas. For example, in FIG. 4B associated with TDD antenna-switched diversity, the second one or more antennas (antennas 426 and 428) may not include the first one or more antennas (antennas 422 and 424).

In some aspects, the UE may also determine whether antenna-switched diversity, regardless of whether TDD-based or FDD-based, is limited. For example, in some aspects, hardware limitations or communication constraints/requirements may limit the extent of antenna-switched diversity that may be utilized for wireless communication.

In some aspects, the UE may determine whether there are hardware limitations or communication constraints/requirements that limit the extent of antenna-switched diversity that may be utilized for wireless communication.

According to some aspects, the UE may perform at least one of the mapping of the transmission path associated with the first SIM, such as at block 304 of FIG. 3, or the mapping of the at least one reception path associated with the second SIM, such as at block 304 of FIG. 3, in accordance with the determination as to whether antenna-switched diversity is limited. For example, in some aspects, the UE may allocate less antennas to the first one or more antennas used for antenna-switched diversity when the UE determines that antenna-switched diversity is limited than when the UE determines that antenna-switched diversity is not limited. As a result, in some aspects, the UE may allocate more antennas to the second one or more antennas used for wireless communication associated with the second SIM when the UE determines that antenna-switched diversity is limited than when the UE determines that antenna-switched diversity is not limited.

In some aspects, the UE may also determine whether one or more of the second one or more antennas are needed for wireless communication associated with the second SIM. For example, in some aspects, hardware limitations or communication constraints/requirements may require that two antennas be used for wireless communication associated with the second SIM. In additional aspects, hardware limitations or communication constraints/requirements may dictate that only one antenna is needed for wireless communication associated with the second SIM. As an example, when the signal power or the signal-to-noise ratio (SNR) associated with the wireless communication associated with the second SIM is greater than (or equal to) a certain threshold, the UE may determine that only one antenna is needed for wireless communication associated with the second SIM. In some aspects, the UE may determine whether one or more of the second one or more antennas are needed wireless communication associated with the second SIM in accordance with hardware limitations or communication constraints/requirements associated with wireless communication associated with the second SIM.

According to some aspects, the UE may perform at least one of the mapping of the transmission path associated with the first SIM, such as at block 304 of FIG. 3, or the mapping of the at least one reception path associated with the second SIM, such as at block 304 of FIG. 3, in accordance with the determination as to whether one or more of the second one or more antennas are needed for wireless communication associated with the second SIM. For example, in some aspects, the UE may allocate more antennas to the second one or more antennas used for wireless communication associated with the second SIM when the UE determines that more antennas are needed for wireless communication associated with the second SIM. As a result, in some aspects, the UE may allocate less antennas to the first one or more antennas used for antenna-switched diversity when the UE determines that more antennas are needed for wireless communication associated with the second SIM. In additional aspects, the UE may allocate less antennas, e.g., one antenna, to the second one or more antennas used for wireless communication associated with the second SIM when the UE determines that less antennas, e.g., one antenna, are needed for wireless communication associated with the second SIM. As a result, in some aspects, the UE may allocate more antennas to the first one or more antennas used for antenna-switched diversity when the UE determines that less antennas, e.g., one antenna, are needed for wireless communication associated with the second SIM.

In some aspects, the mapping of the transmission path associated with the first SIM to one of the first one or more antennas, such as at block 304 of FIG. 3, and the mapping of the at least one reception path associated with the second SIM to the second one or more antennas, such as at block 304 of FIG. 3, may be performed at least semi-collaboratively. For example, in some aspects, the UE may map the transmission path associated with the first SIM to one of the first one or more antennas in accordance with the mapping of the at least one reception path associated with the second SIM to the second one or more antennas. In additional aspects, the UE may map the at least one reception path associated with the second SIM to the second one or more antennas in accordance with the mapping of the transmission path associated with the first SIM to one of the first one or more antennas.

Figure 6:
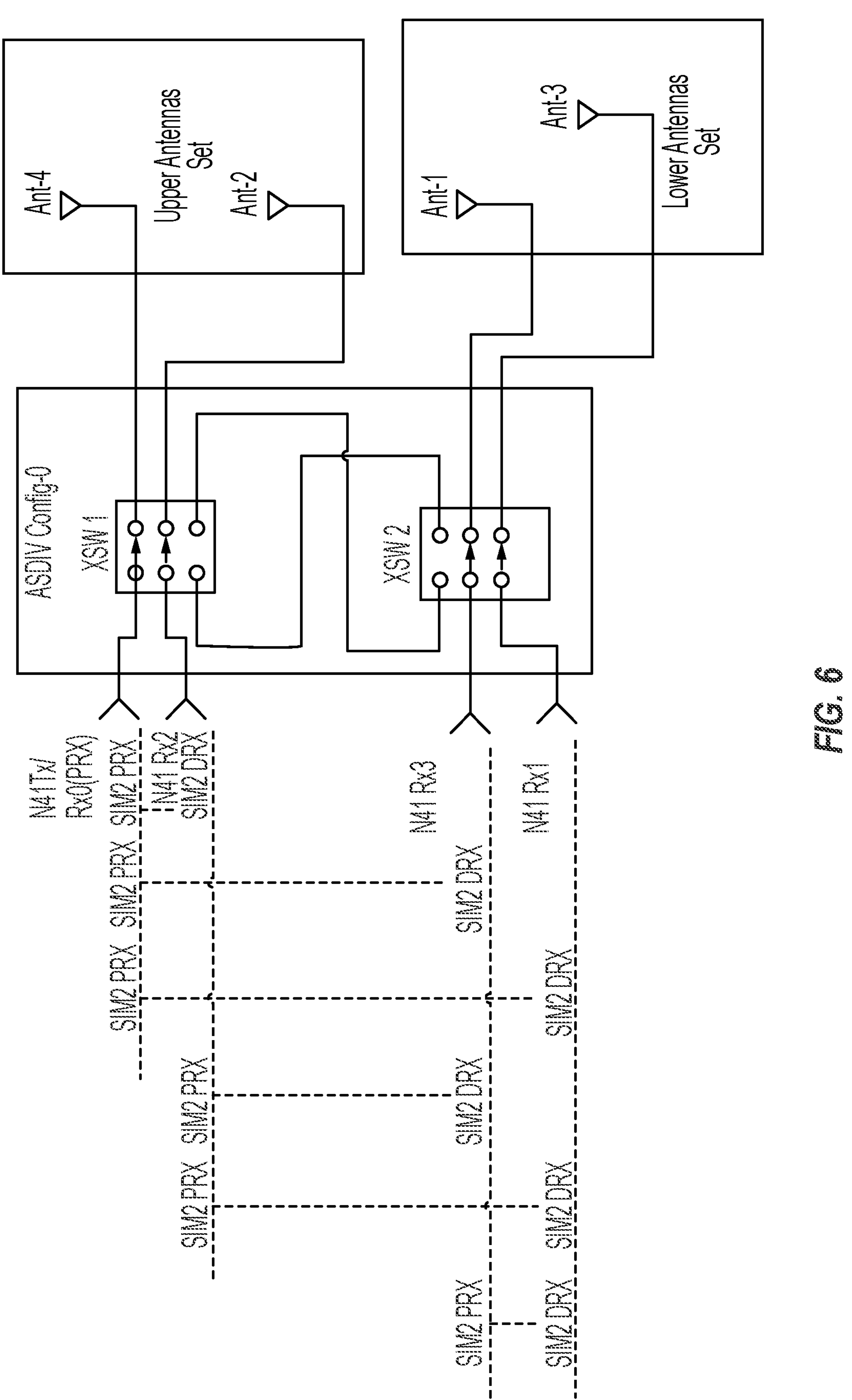
FIG. 6 is another block diagram illustrating an example of FDD antenna-switched diversity and multi-SIM concurrent operation management according to some aspects of the present disclosure.

FIG. 6 shows another block diagram illustrating an example of FDD antenna-switched diversity and multi-SIM concurrent operation management according to some aspects of the present disclosure. For example, FIG. 6 illustrates various ways that at least one reception path associated with the second SIM may be mapped to a second one or more antennas when a transmission path associated with the first SIM is mapped to one of a first one or more antennas. FIG. 6 also illustrates that various switching hardware may be utilized to couple the transmission and/or reception paths associated with the first and/or second SIMs to different antennas. For example, in FIG. 6, two switching components are utilized to electrically couple transmission and/or reception paths associated with the first and/or second SIMs to different antennas. As an example, in FIG. 6, switch XSW 1 may be associated with antennas 4 and 2 and switch XSW 2 may be associated with antennas 1 and 3. As illustrated in FIG. 6, when a transmission or reception path at an input to one of the switches needs to be electrically coupled to an antenna associated with the other switching component, the switches may couple to each to create the needed switching configuration. For example, an output of one switch may be coupled to the input of the other switch.

Figure 7:
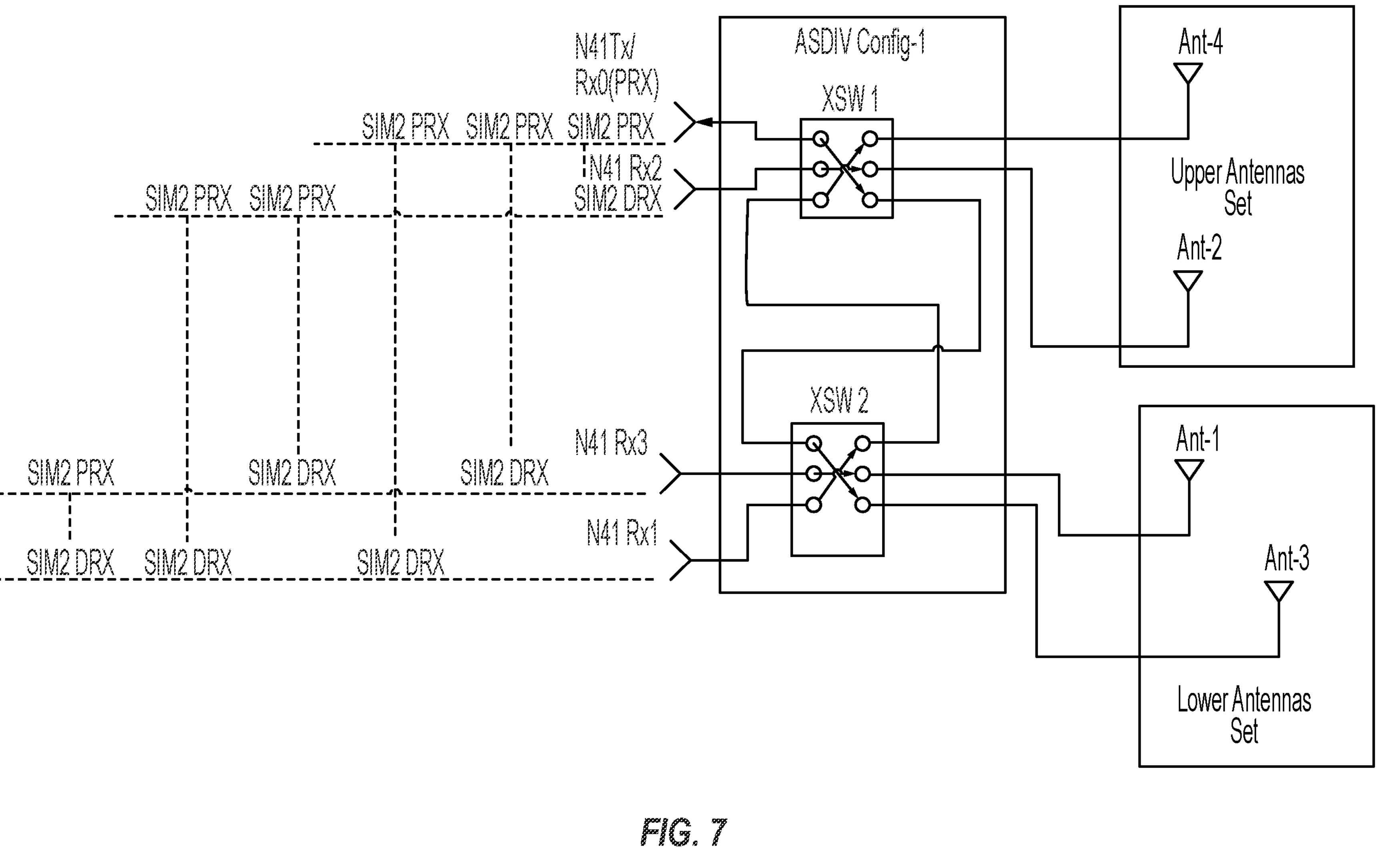
FIG. 7 is yet another block diagram illustrating an example of FDD antenna-switched diversity and multi-SIM concurrent operation management according to some aspects of the present disclosure.

FIG. 7 shows yet another block diagram illustrating an example of FDD antenna-switched diversity and multi-SIM concurrent operation management according to some aspects of the present disclosure. Although FIG. 7 may show a similar architecture as the physical architecture shown in FIG. 6, FIG. 7 shows a different switching configuration. As shown by FIGS. 4-7, numerous physical architectures and switching configurations are possible to couple transmission and/or reception paths associated with the first and/or second SIMs to different antennas. Accordingly, a person of ordinary skill in the art would readily recognize that various architectures and configurations not illustrated in the figures of this disclosure may still fall within the scope of this disclosure so long as they perform the functions disclosed herein.

Figure 8:
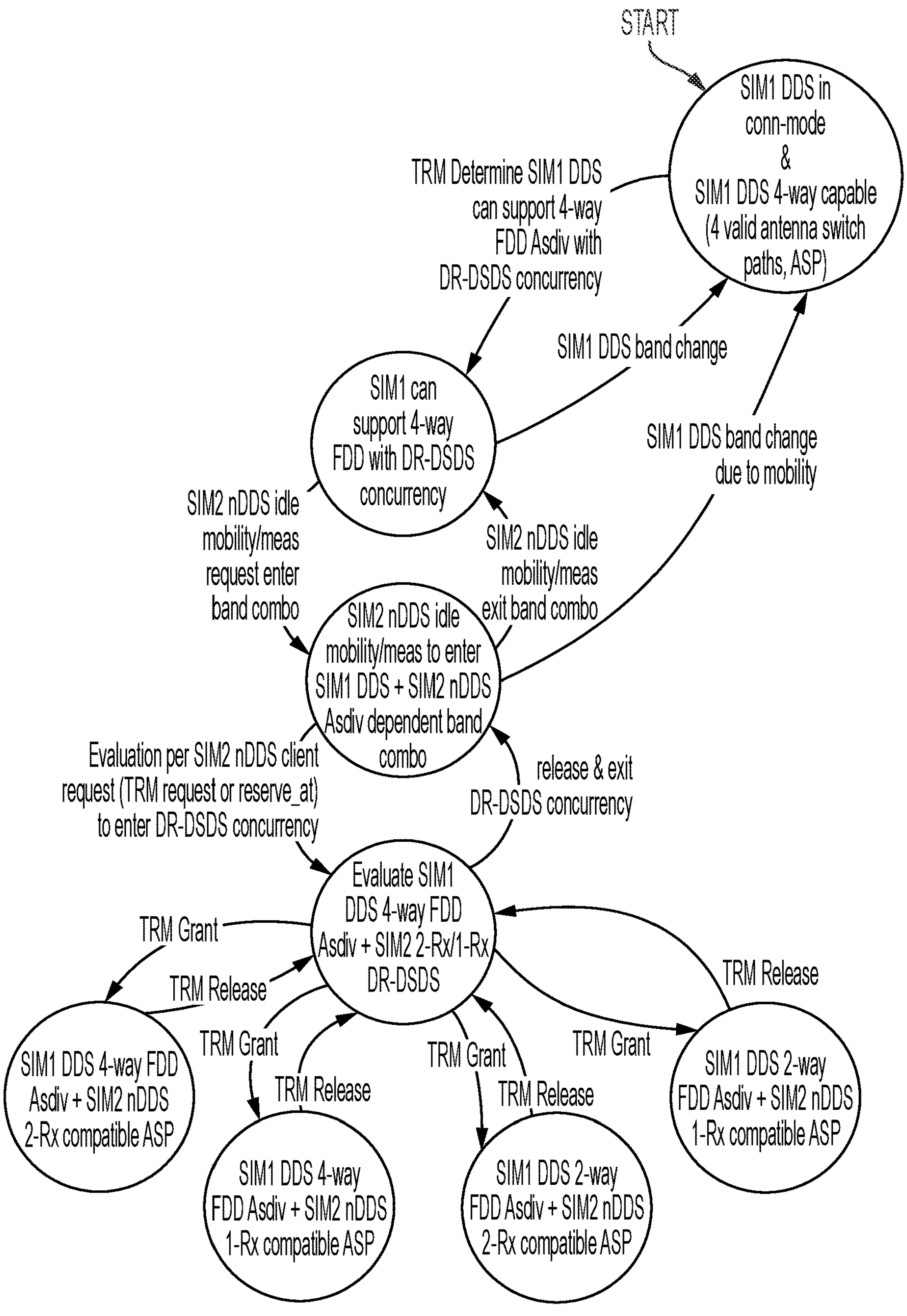
FIG. 8 is a state diagram illustrating an example of states for antenna-switched diversity and multi-SIM concurrent operation management according to some aspects of the present disclosure.
Figure 8:
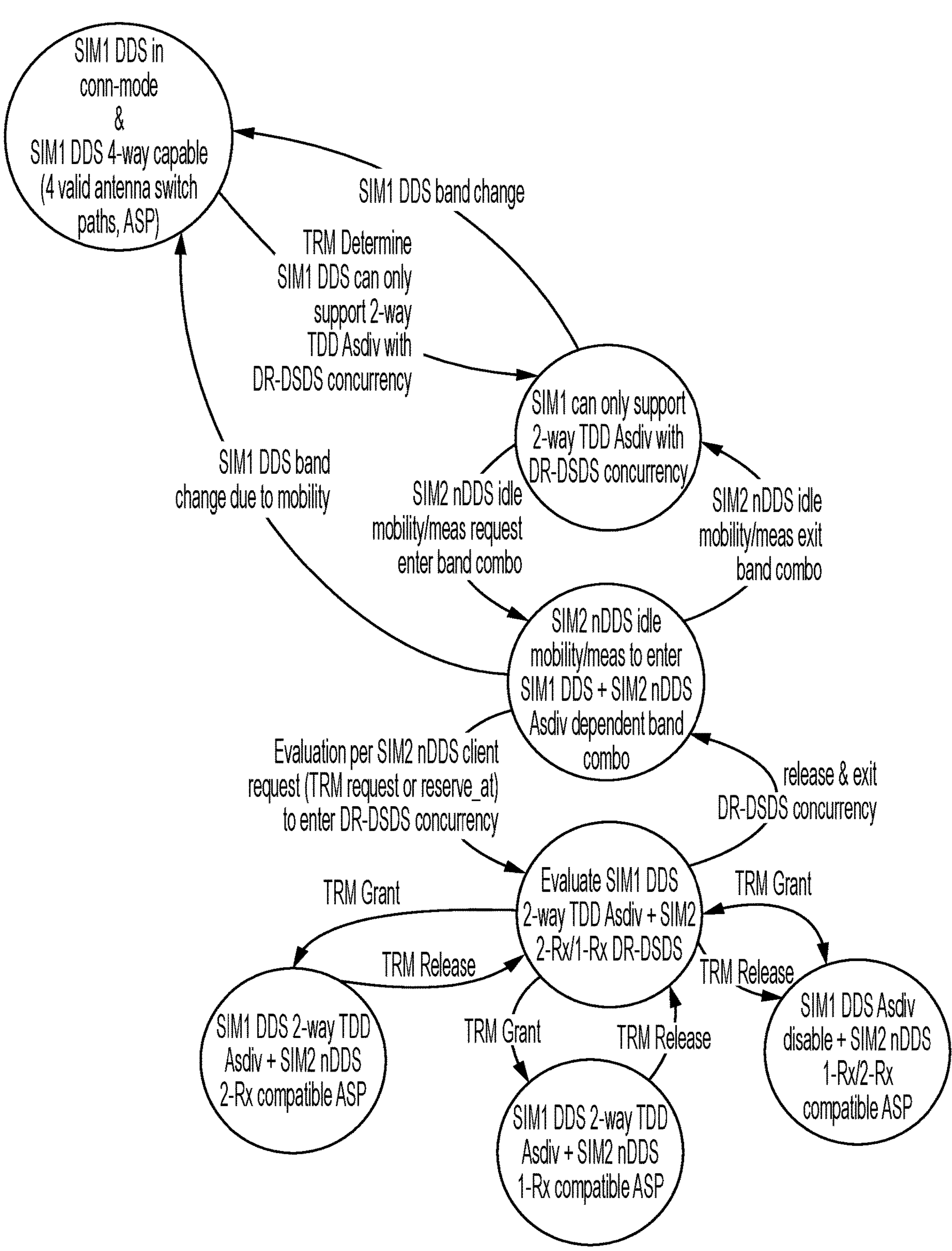

FIG. 8 shows a state diagram illustrating an example of states for antenna-switched diversity and multi-SIM concurrent operation management according to some aspects of the present disclosure. In some aspects, method 300 of FIG. 3 may include one or more of the operations shown in the state diagram of FIG. 8.

Figure 9:
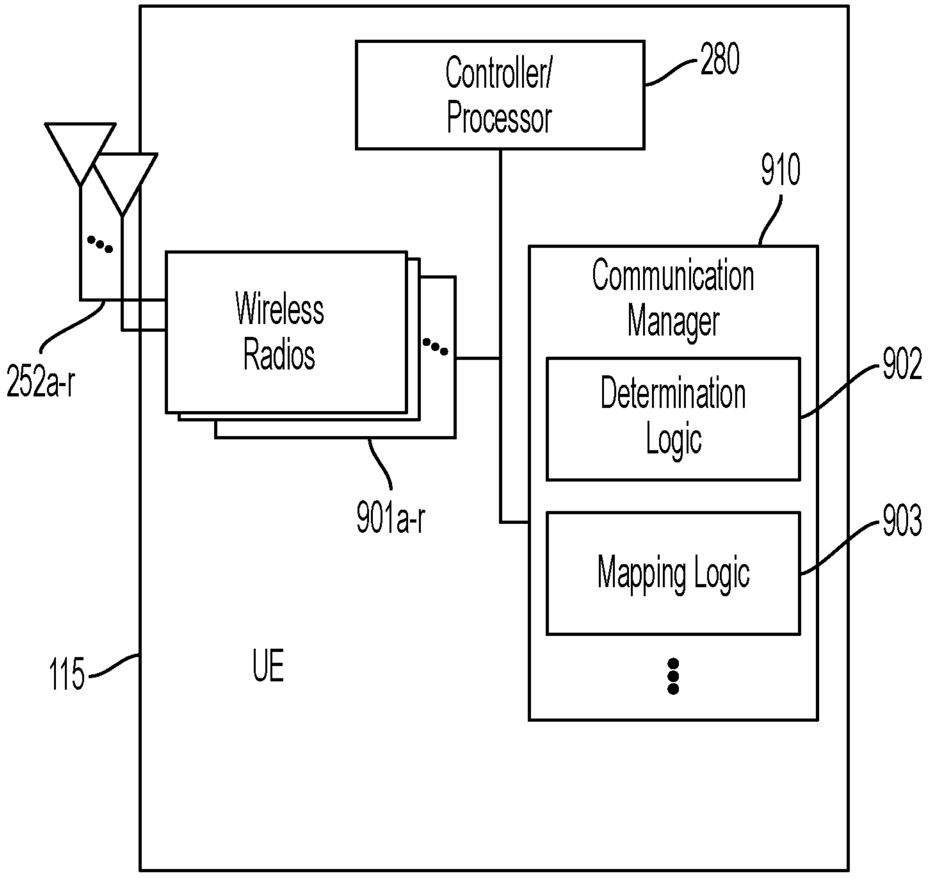
FIG. 9 is a block diagram conceptually illustrating an example of a design of a UE configured according to some aspects of the present disclosure.

FIG. 9 shows a block diagram conceptually illustrating an example of a design of a UE configured according to some aspects of the present disclosure. UE 115 may be configured to perform operations, including the blocks of the method 300 described with reference to FIG. 3. In some implementations, the UE 115 includes the structure, hardware, and components shown and described with reference to the UE 115 of FIGS. 1-2 or FIGS. 4-7. For example, the UE 115 includes the controller 280, which operates to execute logic or computer instructions illustrated in communication manager 910, as well as controlling the components of the UE 115 that provide the features and functionality of the UE 115. The UE 115, under control of the controller 280, transmits and receives signals via wireless radios 901*a-r* and the antennas 252*a-r*. The wireless radios 901*a-r* include various components and hardware, as illustrated in FIGS. 2 and 4-7 for the UE 115, including the modulator and demodulators 254*a-r*, the MIMO detector 256, the receive processor 258, the transmit processor 264, and the TX MIMO processor 266.

Communication manager 910 may include Determination Logic 902 and Mapping Logic 903. Portions of one or more of the components 902 and 903 may be implemented at least in part in hardware or software. In some implementations, at least one of the components 902 and 903 is implemented at least in part as software stored in a memory (such as memory 282). For example, portions of one or more of the components 902 and 903 can be implemented as non-transitory instructions or code executable by a processor (such as the controller 280) to perform the functions or operations of the respective component.

One or more of the components 902 and 903 illustrated in communication manager 910 may configure processor/controller 280 and other components illustrated in FIGS. 1-2 and 4-7 to carry out one or more procedures relating to wireless communication by the UE 115, as previously described. For example, Determination Logic 902 may configure controller/processor 280 and other components illustrated in FIGS. 1-2 and 4-7 to carry out operations that include communicating (e.g., transmitting using antennas 252*a-r*) via a transmission path that is associated with a first SIM and is mapped to UE's one or more antennas in accordance with determining whether the UE supports at least one of FDD antenna-switched diversity or TDD antenna-switched diversity when concurrently performing wireless communication associated with a first SIM and wireless communication associated with a second SIM, such as with reference to block 302 (see FIG. 3). The determination logic 902 may configure controller/processor 280 and other components illustrated in FIGS. 1-2 and 4-7 to carry out operations that include communicating (e.g., receiving using antennas 252*a-r*) via a reception path that is associated with the second SIM and is mapped to UE's one or more antennas in accordance with determining whether the UE supports at least one of FDD antenna-switched diversity or TDD antenna-switched diversity.

Additionally, Mapping Logic 903 may configure controller/processor 280 and other components illustrated in FIGS. 1-2 and 4-7 to carry out operations that include mapping a transmission path associated with the first SIM to one of a first one or more antennas in accordance with the determination as to whether the UE supports at least one of FDD antenna-switched diversity or TDD antenna-switched diversity, such as with reference to block 304 (see FIG. 3). Additionally, Mapping Logic 903 may configure controller/processor 280 and other components illustrated in FIGS. 1-2 and 4-7 to carry out operations that include mapping at least one reception path associated with the second SIM to a second one or more antennas in accordance with the determination as to whether the UE supports at least one of FDD antenna-switched diversity or TDD antenna-switched diversity, wherein the mappings of the transmission path and the at least one reception path are performed so as to prevent an antenna switch conflict from occurring when concurrently performing wireless communication associated with the first SIM and wireless communication associated with the second SIM, such as with reference to block 304 (see FIG. 3). The UE 115 may receive signals from or transmit signals to one or more network entities, such as the base station 105 of FIGS. 1-2.

It is noted that one or more blocks (or operations) described with reference to FIG. 3 may be combined with one or more blocks (or operations) described with reference to another of the figures. For example, one or more blocks (or operations) of FIG. 3 may be combined with one or more blocks (or operations) of FIG. 1-2 or 4-9. As another example, one or more blocks associated with FIG. 9 may be combined with one or more blocks (or operations) associated with FIGS. 1-8.

In some aspects, techniques for antenna-switched diversity and multi-SIM concurrent operation management may include a UE determining whether the UE supports at least one of FDD antenna-switched diversity or TDD antenna-switched diversity when concurrently performing wireless communication associated with a first SIM and wireless communication associated with a second SIM. Techniques for antenna-switched diversity and multi-SIM concurrent operation management may also include a UE mapping a transmission path associated with the first SIM to one of a first one or more antennas in accordance with the determination as to whether the UE supports at least one of FDD antenna-switched diversity or TDD antenna-switched diversity. Techniques for antenna-switched diversity and multi-SIM concurrent operation management may further include a UE mapping at least one reception path associated with the second SIM to a second one or more antennas in accordance with the determination as to whether the UE supports at least one of FDD antenna-switched diversity or TDD antenna-switched diversity. In some aspects, the mappings of the transmission path and the at least one reception path may be performed so as to prevent an antenna switch conflict from occurring when concurrently performing wireless communication associated with the first SIM and wireless communication associated with the second SIM.

In one or more aspects, techniques for antenna-switched diversity and multi-SIM concurrent operation management may include additional aspects, such as any single aspect or any combination of aspects described below and/or in connection with one or more other processes described elsewhere herein. In a first aspect, techniques for antenna-switched diversity and multi-SIM concurrent operation management may include communicating via a transmission path associated with a first subscriber identification module (SIM); the transmission path may be mapped to one of a first one or more antennas in accordance with a determination as to whether the UE supports at least one of FDD antenna-switched diversity or TDD antenna-switched diversity when concurrently performing wireless communication associated with the first SIM and wireless communication associated with a second SIM. The techniques may also include communicating via at least one reception path associated with the second SIM; the at least one reception path mapped to a second one or more antennas in accordance with the determination as to whether the UE supports at least one of FDD antenna-switched diversity or TDD antenna-switched diversity.

In a second aspect, in combination with the first aspect, the transmission path and the at least one reception path are respectively mapped to the one of the first one or more antennas and the one of the second one or more antennas to prevent an antenna switch conflict from occurring when concurrently performing wireless communication associated with the first SIM and wireless communication associated with the second SIM.

In a third aspect, in combination with the second aspect, the antenna switch conflict comprises reconfiguration of the transmission path or reconfiguration of the at least one reception path.

In a fourth aspect, in combination with one or more of the first aspect or second aspect, the first one or more antennas comprises more antennas when the UE supports FDD antenna-switched diversity than when the UE supports TDD antenna-switched diversity.

In a fifth aspect, in combination with one or more of the first through fourth aspect, the second one or more antennas comprise a subset of the first one or more antennas.

In a sixth aspect, in combination with one or more of the first through fifth aspect, the second one or more antennas do not include the first one or more antennas.

In a seventh aspect, in combination with one or more of the first through sixth aspect, at least one of the transmission path associated with the first SIM or the at least one reception path associated with the second SIM is mapped in accordance with a determination as to whether antenna-switched diversity is limited, wherein the first one or more antennas comprises less antennas when antenna-switched diversity is limited than when antenna-switched diversity is not limited.

In an eighth aspect, in combination with one or more of the first through seventh aspect, the at least one reception path is mapped to additional second one or more antennas in accordance with a determination that the additional second one or more antennas are needed for wireless communication associated with the second SIM, and wherein the transmission path is mapped to a reduced number of the first one or more antennas in accordance with the determination that the additional second one or more antennas are needed for wireless communication associated with the second SIM.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

Those of skill would further appreciate that the various illustrative logical blocks, modules, circuits, and algorithm steps (e.g., the logical blocks in FIG. 3) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term “and/or,” when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, “or” as used in a list of items prefaced by “at least one of” indicates a disjunctive list such that, for example, a list of “at least one of A, B, or C” means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a user equipment (UE), the method comprising:

communicating via a transmission path associated with a first subscriber identification module (SIM), the transmission path mapped to one of a first one or more antennas in accordance with a determination as to whether the UE supports at least one of frequency-division duplex (FDD) antenna-switched diversity or time-division duplex (TDD) antenna-switched diversity when concurrently performing wireless communication associated with the first SIM and wireless communication associated with a second SIM; and communicating, via at least one reception path associated with the second SIM, the at least one reception path mapped to a second one or more antennas in accordance with the determination as to whether the UE supports at least one of FDD antenna-switched diversity or TDD antenna-switched diversity, wherein the transmission path and the at least one reception path are respectively mapped to the one of the first one or more antennas and the one of the second one or more antennas to prevent an antenna switch conflict from occurring when concurrently performing wireless communication associated with the first SIM and wireless communication associated with the second SIM.

2. The method of claim 1, wherein the antenna switch conflict comprises reconfiguration of the transmission path or reconfiguration of the at least one reception path.

3. The method of claim 1, wherein the first one or more antennas comprises more antennas when the UE supports FDD antenna-switched diversity than when the UE supports TDD antenna-switched diversity.

4. The method of claim 1, wherein the second one or more antennas comprise a subset of the first one or more antennas.

5. The method of claim 1, wherein the second one or more antennas do not include the first one or more antennas.

6. The method of claim 1, wherein at least one of the transmission path associated with the first SIM or the at least one reception path associated with the second SIM is mapped in accordance with a determination as to whether antenna-switched diversity is limited, wherein the first one or more antennas comprises less antennas when antenna-switched diversity is limited than when antenna-switched diversity is not limited.

7. The method of claim 1, wherein the at least one reception path is mapped to additional second one or more antennas in accordance with a determination that the additional second one or more antennas are needed for wireless communication associated with the second SIM, and wherein the transmission path is mapped to a reduced number of the first one or more antennas in accordance with the determination that the additional second one or more antennas are needed for wireless communication associated with the second SIM.

8. A user equipment (UE) configured for wireless communication, comprising:

means for communicating via a transmission path associated with a first subscriber identification module (SIM), the transmission path mapped to one of a first one or more antennas in accordance with a determination as to whether the UE supports at least one of frequency-division duplex (FDD) antenna-switched diversity or time-division duplex (TDD) antenna-switched diversity when concurrently performing wireless communication associated with the first SIM and wireless communication associated with a second SIM; and means for communicating via at least one reception path associated with the second SIM, the at least one reception path mapped to a second one or more antennas in accordance with the determination as to whether the UE supports at least one of FDD antenna-switched diversity or TDD antenna-switched diversity, wherein the transmission path and the at least one reception path are respectively mapped to the one of the first one or more antennas and the one of the second one or more antennas to prevent an antenna switch conflict from occurring when concurrently performing wireless communication associated with the first SIM and wireless communication associated with the second SIM.

9. The UE of claim 8, wherein the antenna switch conflict comprises reconfiguration of the transmission path or reconfiguration of the at least one reception path.

10. The UE of claim 8, wherein the first one or more antennas comprises more antennas when the UE supports FDD antenna-switched diversity than when the UE supports TDD antenna-switched diversity.

11. The UE of claim 8, wherein the second one or more antennas do not include the first one or more antennas.

12. The UE of claim 8, wherein at least one of the transmission path associated with the first SIM or the at least one reception path associated with the second SIM is mapped in accordance with a determination as to whether antenna-switched diversity is limited, wherein the first one or more antennas comprises less antennas when antenna-switched diversity is limited than when antenna-switched diversity is not limited.

13. The UE of claim 8, wherein the at least one reception path is mapped to additional second one or more antennas in accordance with a determination that the additional second one or more antennas are needed for wireless communication associated with the second SIM, and wherein the transmission path is mapped to a reduced number of the first one or more antennas in accordance with the determination that the additional second one or more antennas are needed for wireless communication associated with the second SIM.

14. The UE of claim 8, wherein the second one or more antennas comprise a subset of the first one or more antennas.

15. A non-transitory computer-readable medium having program code recorded thereon, the program code comprising:

program code executable by a computer for causing the computer to communicate via a transmission path associated with a first subscriber identification module (SIM), the transmission path mapped to one of a first one or more antennas in accordance with a determination as to whether a user equipment (UE) supports at least one of frequency-division duplex (FDD) antenna-switched diversity or time-division duplex (TDD) antenna-switched diversity when concurrently performing wireless communication associated with the first SIM and wireless communication associated with a second SIM; and program code executable by the computer for causing the computer to communicate via at least one reception path associated with the second SIM, the at least one reception path mapped to a second one or more antennas in accordance with the determination as to whether the UE supports at least one of FDD antenna-switched diversity or TDD antenna-switched diversity, wherein the transmission path and the at least one reception path are respectively mapped to the one of the first one or more antennas and the one of the second one or more antennas to prevent an antenna switch conflict from occurring when concurrently performing wireless communication associated with the first SIM and wireless communication associated with the second SIM.

16. The non-transitory computer-readable medium of claim 7, wherein the antenna switch conflict comprises reconfiguration of the transmission path or reconfiguration of the at least one reception path.

17. The non-transitory computer-readable medium of claim 15, wherein the first one or more antennas comprises more antennas when the UE supports FDD antenna-switched diversity than when the UE supports TDD antenna-switched diversity.

18. The non-transitory computer-readable medium of claim 15, wherein the second one or more antennas comprise a subset of the first one or more antennas.

19. The non-transitory computer-readable medium of claim 15, wherein the second one or more antennas do not include the first one or more antennas.

20. The non-transitory computer-readable medium of claim 15, wherein at least one of the transmission path associated with the first SIM or the at least one reception path associated with the second SIM is mapped in accordance with a determination as to whether antenna-switched diversity is limited, wherein the first one or more antennas comprises less antennas when antenna-switched diversity is limited than when antenna-switched diversity is not limited.

21. The non-transitory computer-readable medium of claim 15, wherein the at least one reception path is mapped to additional second one or more antennas in accordance with a determination that the additional second one or more antennas are needed for wireless communication associated with the second SIM, and wherein the transmission path is mapped to a reduced number of the first one or more antennas in accordance with the determination that the additional second one or more antennas are needed for wireless communication associated with the second SIM.

22. A user equipment (UE), comprising:

at least one processor; and at least one memory communicatively coupled with the at least one processor and storing processor-readable code that, when executed by the at least one processor, is configured to:

communicate via a transmission path associated with a first subscriber identification module (SIM), the transmission path mapped to one of a first one or more antennas in accordance with a determination as to whether the UE supports at least one of frequency-division duplex (FDD) antenna-switched diversity or time-division duplex (TDD) antenna-switched diversity when concurrently performing wireless communication associated with the first SIM and wireless communication associated with a second SIM; and communicate via at least one reception path associated with the second SIM, the at least one reception path mapped to a second one or more antennas in accordance with the determination as to whether the UE supports at least one of FDD antenna-switched diversity or TDD antenna-switched diversity, wherein the transmission path and the at least one reception path are respectively mapped to the one of the first one or more antennas and the one of the second one or more antennas to prevent an antenna switch conflict from occurring when concurrently performing wireless communication associated with the first SIM and wireless communication associated with the second SIM.

23. The UE of claim 22, wherein the antenna switch conflict comprises reconfiguration of the transmission path or reconfiguration of the at least one reception path.

24. The UE of claim 22, wherein the first one or more antennas comprises more antennas when the UE supports FDD antenna-switched diversity than when the UE supports TDD antenna-switched diversity.

25. The UE of claim 22, wherein the second one or more antennas comprise a subset of the first one or more antennas.

26. The UE of claim 22, wherein at least one of the transmission path associated with the first SIM or the at least one reception path associated with the second SIM is mapped in accordance with a determination as to whether antenna-switched diversity is limited, wherein the first one or more antennas comprises less antennas when antenna-switched diversity is limited than when antenna-switched diversity is not limited.

27. The UE of claim 22, wherein the at least one reception path is mapped to additional second one or more antennas in accordance with a determination that the additional second one or more antennas are needed for wireless communication associated with the second SIM, and wherein the transmission path is mapped to a reduced number of the first one or more antennas in accordance with the determination that the additional second one or more antennas are needed for wireless communication associated with the second SIM.

* * * * *